Aug. 15, 1961 E. H. GATZERT 2,996,582

DISCRIMINATING TRUNK CIRCUIT

Filed April 30, 1958

4 Sheets-Sheet 1

INVENTOR
ERNEST H. GATZERT
BY
ATTORNEY

Aug. 15, 1961 E. H. GATZERT 2,996,582

DISCRIMINATING TRUNK CIRCUIT

Filed April 30, 1958 4 Sheets-Sheet 2

Aug. 15, 1961 E. H. GATZERT 2,996,582

DISCRIMINATING TRUNK CIRCUIT

Filed April 30, 1958 4 Sheets-Sheet 4

United States Patent Office 2,996,582

Patented Aug. 15, 1961

2,996,582

DISCRIMINATING TRUNK CIRCUIT

Ernest H. Gatzert, Rochester, N.Y., assignor to General Dynamics Corporation, Rochester, N.Y., a corporation of Delaware Filed Apr. 30, 1958, Ser. No. 731,936
7 Claims. (Cl. 179—18)

Figures 1, 2:
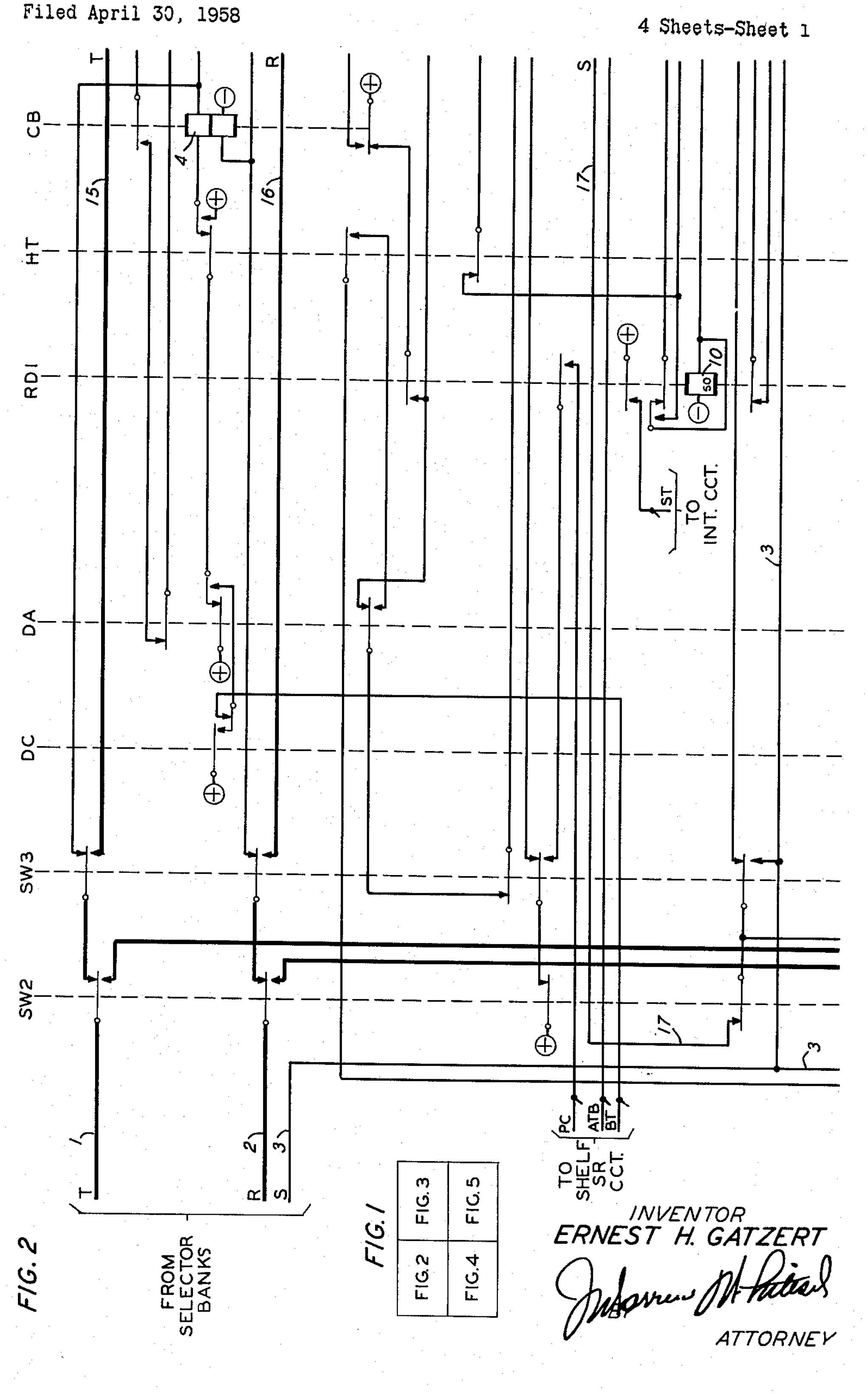
Figure 3:
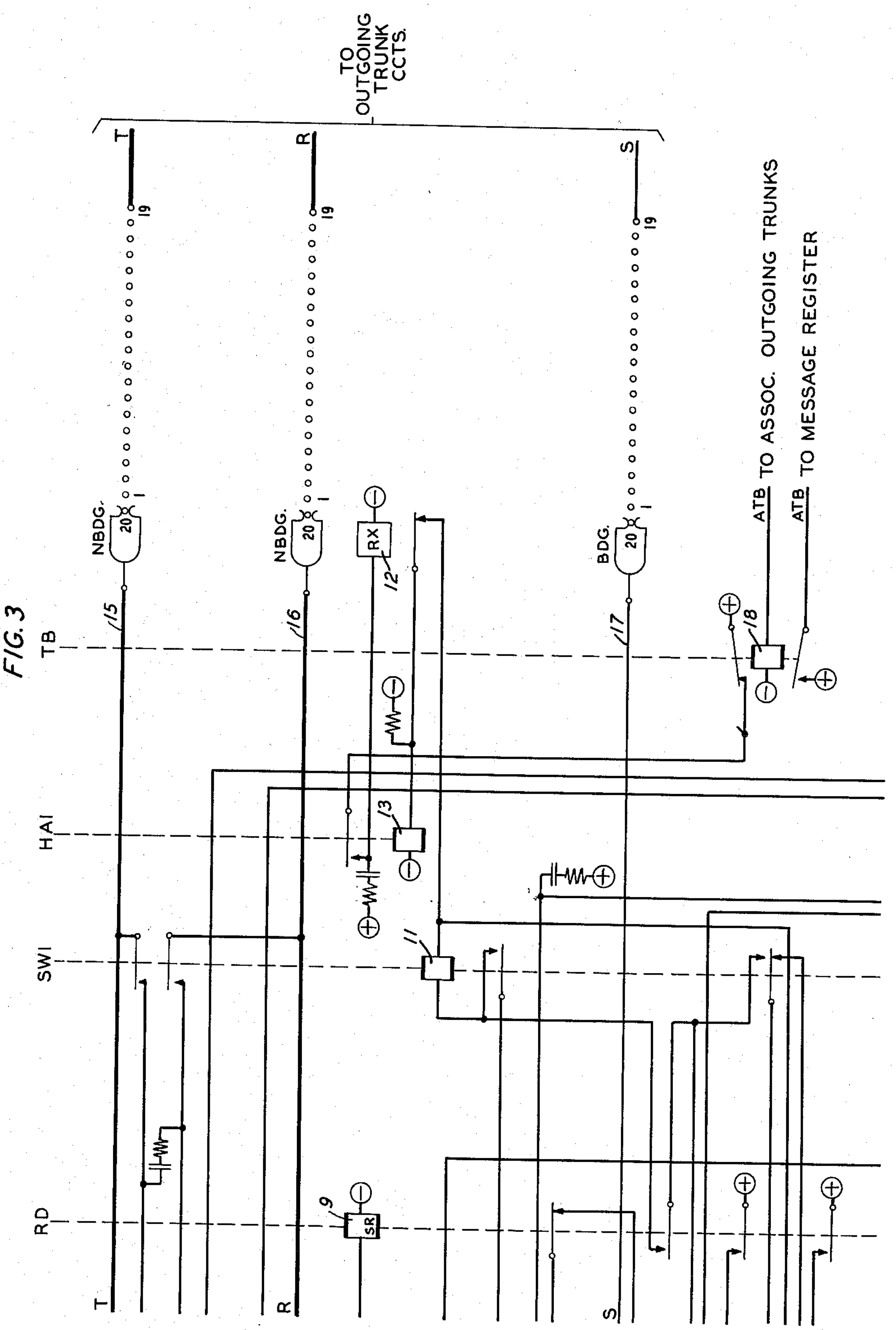
Figure 4:
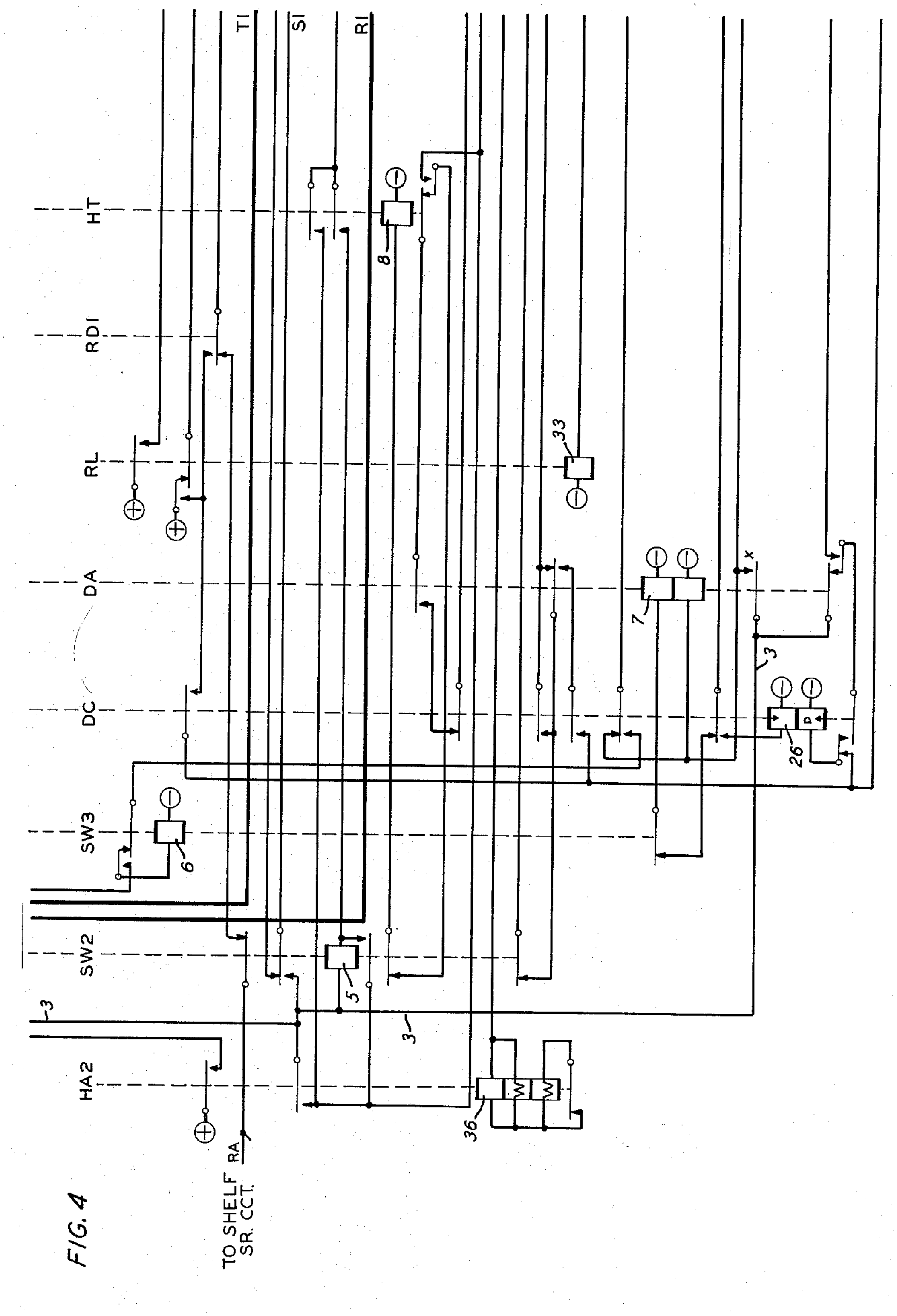
Figure 5:
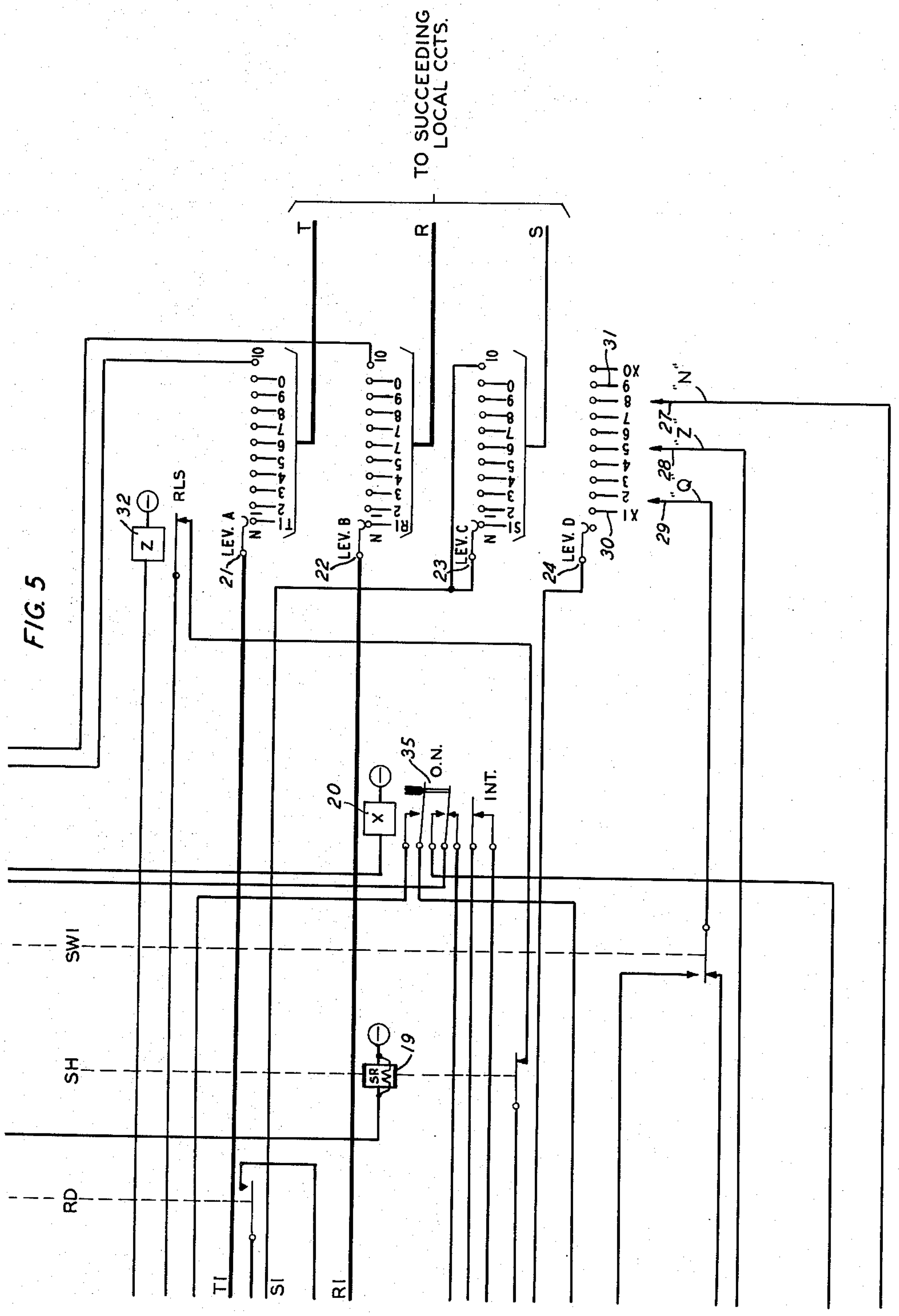

This invention relates to telecommunication systems and particularly to means therein to route a telephone call over either extended area circuits or over local circuits by simple and inexpensive means.

The object of the invention is to provide economical means to provide for special service calls, some of which are directed to distant points and some of which are directed to local circuits.

Another object of the invention is to provide a simple one movement stepping switch which will respond to two digital control operations, the first to select a given group of trunk outlets, the second to select a particular trunk number and to thereafter either retire, or alternatively, to hunt over a group of trunks appearing therein.

In accordance with the present invention the trunk consists of a circuit arrangement terminating in two outgoing branches, one leading through a preselector to an idle outgoing extended area trunk and another leading through a stepping switch to a group of local circuits. In the operation of the trunk the stepping switch is arranged to respond to two digits dialed thereinto and to retire to a normal position after each of said two operations. The said two movements of this stepping switch then determine the choice of the said two branches to be used, whereupon the stepping switch retires to normal, the trunk is cut through to the said outgoing trunk circuit and the branch containing the stepping switch is cut off or, alternatively, the branch through the preselector switch to the outgoing trunk is cut off and the stepping switch then carries out a third movement to select an idle one of a group of local circuits. The invention is characterized by the use of a single movement stepping switch which makes a plurality of trips, one for each digit dialed thereinto, retiring to the normal position after each such trip and then making an additional trunk hunting trip if, through its own movements, it selects for use that branch of the trunk containing this stepping switch. In other words, the invention is characterized by the use of a single movement switch which performs a plurality of functions each on a separate movement thereof and in which each said movement starts from a normal or home position.

The invention is further characterized in this, that the dial pulses used to set the said stepping switch are also repeated over the preselected outgoing trunk to set distant switches so that when and if such an outgoing trunk is selected the dial pulses used for selecting it will also be employed for selection of a circuit thereover. Thus the dial pulses having given characteristics perform the double service of making a selection at the end of extended trunk and of confirming the use of such trunk. In case the selection is of a local circuit then the said extended trunk is released so that what might be termed a tentative selection is relinquished.

A feature of the invention is a trunk circuit having a pair of outgoing branches, one having dial pulse operated means at a distant point and another having dial pulse operated local means, both of which respond to incoming dial pulses, the said local means functioning to select for use one or the other of said branches and to cause the release of the dial operated means on the said branch which has not been selected.

Another feature of the invention is a trunk circuit having two outgoing branches one of which terminates in a single movement stepping switch which responds to all trains of incoming dial pulses to first make a selection of one of said branches and to then either retire, if the other branch is selected, or to enter upon an automatic line hunting movement, if its own branch has been selected.

Another feature of the invention is the use of a single movement stepping switch having a plurality of brushes each traversing a different group of contacts, one brush and its contacts being used on certain given movements thereof for discrimination purposes and another brush and its contacts being used on a later movement thereof for idle line selecting purposes.

Other features will appear hereinafter.

The drawings consist of four sheets having five figures, as follows;

FIG. 1 is a block diagram showing how FIGURES 2 to 5 inclusive may be placed to provide a complete schematic circuit diagram; and FIGS. 2 to 5 are each portions of a complete circuit diagram of the trunk circuit embodying the present invention.

*Seizure*

In the operation of the device of the present invention it will be understood that the tip, ring and sleeve conductors 1, 2 and 3 respectively come from the bank terminals of a previous local selector and it is assumed that they come from the level one of such device since such numbers as 113 (information), 114 (repair) and 119 (reverting call) are to be dialed. In the following description the second and third digits of these numbers will be spoken of as the first and second digits (since the real first digit has already been dialed). Since the sleeve wire is free of any connection when this circuit is idle, it may be seized. If the circuit is busy then the sleeve wire 3 will be connected to ground and a connection to this circuit will be denied.

Assuming the circuit to be idle, then the circuit will be seized and the tip and ring loop in the previous switch will be bridged on the calling bridge CB relay 4 over the back contacts of the SW–2 relay 5 and the SW–3 relay 6, the upper winding of the CB relay 4 finding a ground through the normal contacts of the DA relay 7 and the HT relay 8. The CB relay responds and closes a direct circuit to the release delay RD relay 9 and this relay in turn energizes the circuit of its slow operating slave RD–1 relay 10. It may now be noted that upon the operation of the RD relay 9 and before the RD–1 relay 10 can respond a circuit is established from a ground, an armature and front contact of the RD relay 9, the normal contacts of the RD–1 relay 10, another armature and front contact of the RD relay 9, the winding of the SW–1 relay 11, the interrupter contacts of the preselector stepping magnet 12 and the winding of the HA–1 relay 13 to battery. This latter relay has a comparatively low resistance winding whereas the SW–1 relay 11 has a comparatively high resistance winding, whereby the SW–1 relay 11 will operate but the HA–1 relay 13 will not respond. The SW–1 relay 11 in operating closes a locking circuit for itself through a back contact of the HT relay 8 and the operated contacts of the RD–1 relay 10 when this relay shortly becomes operated.

The SW–1 relay 11 and the CB relay 4 place a bridge across the tip and ring conductors 15 and 16 respectively leading to a preselected distant switch and the sleeve conductor 17 is grounded through contacts of the SW–1 relay 11, the RD relay 9 and the HT relay 8 and the RD–1 relay 10 to mark it as busy.

This condition, in which the CB relay 4, the RD relay 9, the RD–1 relay 10 and the SW–1 relay 11 in the presently shown circuit are operated and the calling bridge relay and its release delay relay in the distant outgoing trunk have been operated will be maintained indefinitely or until the calling subscriber operates his dial.

*The stepping of other preselectors*

When the preselected outgoing trunk to which the tip, ring and sleeve wires 15, 16 and 17 are connected is seized, the ground placed on the sleeve wire 17 will be transmitted over the multiple to another sleeve brush if another preselector is also standing on the same outgoing trunk. If we now assume the present circuit to be that of another trunk terminating in such a preselector, it will appear that the ground on the sleeve wire will be transmitted back over normal contacts of the SW–2 relay 5, the SW–3 relay 6, the normal contacts of the SW–1 relay 11, the RD–1 relay 10 to the other side of the winding of the SW–1 relay 11 whereby the HA–1 relay will be energized directly and not in series with the SW–1 relay as before. Therefore, the HA–1 relay will become energized. This will close the TB ground from the TB relay 18 through the contacts of the HA–1 relay 11, the RX preselector stepping magnet 12, to battery and this magnet will interrupt the circuit of the HA–1 relay. Through this conventional operation the HA–1 relay will release and this will allow the stepping magnet 12 to release whereupon the brushes of the preselector will be stepped forward. If the next outgoing trunk is busy this operation will be repeated until an idle outgoing trunk is found. When such an idle circuit is found the loss of ground on the S wire 17 will allow the HA–1 relay to rest in its normal condition upon the closure of the stepping magnet interrupter contacts, so that the circuit will be found in the normal unoperated condition as shown.

*Dialing the first digit*

When the calling party dials, the selector bank tip and ring loop is opened shortly for each dial pulse and the CB relay 4 releases shortly for each pulse. These pulses will both step the 10 position stepping switch used to discriminate between calls being dialed and to establish connections to particular ones of such calls and will be repeated by the CB relay to the preselected outgoing trunk to set the distant switch.

The repeated movement of the grounded armature of the CB relay 4 to its back contact repeatedly closes a circuit for the slow releasing SH relay and for the X magnet 20 whereby the brushes 21, 22, 23 and 24 are advanced on each such energization.

The like repeated movement of the other armature of the CB relay 4 will act as a dialing contact to set the switch at the distant end of the outgoing trunk reached through the preselector.

*Discrimination*

It will be noted that this circuit includes a digit adding DA relay 7 and a digit cancelling DC relay 26. These relays in general are responsive to selective wiring arrangements through connections reached by the brush 24 of the said stepping switch.

Again, in general, if the DA relay is operated first, this will indicate that an improper first digit has been dialed and hence the switch will be released and busy tone will be returned to the calling subscriber. If, on the other hand, the DC relay 26 is operated first, it indicates that a proper first digit has been dialed, whereupon the switch will be released to receive the second digit. If this second digit causes the operation of the DA relay 7, the call will be indicated to be a local call properly handled by the said stepping switch, but if this second digit does not operate the DA relay 7 but, on the other hand, operates the SW–3 relay 6 the call will be indicated to be an outgoing call properly handled over the outgoing trunk selected by the said preselector.

Attention is called to the three wires 27, 28 and 29 known as the "N" wiring, the "Z" wiring and the "Q" wiring respectively. In the present embodiment of the invention the "N" wiring 27 will be connected to the X1 terminal 30, the "Z" wiring 28 will be connected to the X9 terminal 31, and the "Q" wiring 29 will be connected to each of the other terminals between the X1 terminal 30 and the X9 terminal 31, although it will be understood that other arrangements may be made in accordance with other desired discriminations. In accordance with the above stated arrangements, discrimination may be made between such numbers as 113 and 114 which are to be handled at a distant office and the number 119 which is to be handled locally.

It has been stated hereinbefore that since the first digit of these three digit numbers is invariably the same and is a digit through which this circuit is reached, the numbers are considered as two digit numbers in this description. Thus, by the above noted arrangements, including the connections of the "N," "Z" and "Q" wiring to the terminals reached by the brush 24, discrimination may be made between such numbers as 13 and 14 and the number 19. Thus if the number 13 is dialed, the "N" wiring will first be affected to operate the DC relay 26 and thereafter the "Q" wiring will be affected to operate the SW–3 relay 6 whereby the trunk is cut through to the outgoing trunk. If, on the other hand, the number 19 is dialed the "N" wiring will be affected as before and the DC relay 26 will be operated after which the "Z" wiring will be affected, resulting in the operation of the DA relay 7 followed by the operation of the HT relay 8 and then the SW–2 relay 5 so that the trunk is switched to the local stepping switch and the distant outgoing trunk will be released.

Since the proper functioning of this circuit includes both the extension of connections to a distant office over the said outgoing trunk and the extension of connections to local circuits as well as the rejection of improperly dialed connections, both will be described.

*Number 113*

When a subscriber dials the number 113, the first digit is used to reach the circuit of the present invention, that is the first digit "one" will drive a selector to seize the T, R and S terminals 1, 2 and 3 respectively whereupon the circuit will be seized as above described.

When the subscriber then dials "one" again the CB relay releases its armature shortly once. This operates the slow releasing SH relay 19 and operates the stepping switch magnet 20 to move the brushes 21 to 24 inclusive one step forward. Thereupon a circuit will be prepared from battery, the lower winding of the DC relay 26, normal contacts thereof, the "N" wiring lead 27, the X1 terminal 30, brush 24, a back contact and armature of the DA relay 7, a back contact and armature of the SW–2 relay 5, an armature and back contact of the SH relay 19 (which contact is now open rendering this circuit ineffective at present), the back contact and armature of the Z release magnet 32 for this ten point stepping switch, an armature and back contact of the RL relay 33 to ground. The SH relay 19 is a slow releasing relay used for the purpose of holding this circuit open during the dialing of this digit regardless of the number of pulses in the train. When the digit has been completed, then in a period measured by the slow releasing characteristics of this relay this circuit will be closed and the DC relay 26 will respond and will lock itself to the ground on the sleeve wire 3 supplied primarily by the RD relay 9. The RL relay 33 will now be operated in a circuit from battery, its winding, the now closed off normal contacts of this stepping switch, an armature and front contact of the RD–1 relay 10, a front contact and armature of the DC relay 26, thence over the "N" wiring path above traced to the armature and back contact of this RL relay 33. The RL relay, in operating, locks to its own ground and by-passes the said "N" wiring circuit, holding only under control of the off normal contacts 35. The RL relay 33, over a direct circuit, operates the Z release magnet 32, whereby the switch is released to normal thus dropping the RL relay 33 and leaving only the DC relay 26 operated.

Simultaneously with this stepping of the stepping switch throught this single dial pulse operation of the CB relay 4, the bridge across the tip 15 and ring 16 conductors to the outgoing trunk is opened once to cause the stepping of the distant switch.

The subscriber now dials the digit 3 whereupon the stepping switch moves its brushes three steps forward so that brush 24 will come to rest on the X3 terminal and since this, in accordance with our assumption, is connected to the "Q" wiring 29 a circuit will be completed on the release of the SH relay 19 to the winding of the SW–3 relay 6. The SW–3 relay will cut the incoming tip and ring conductors 1 and 2 directly to the outgoing tip and ring conductors 15 and 16 and since the distant switch has been stepped in accordance with the digit 3 as before described, the calling subscriber will reach the dialed number properly.

The selector tip and ring loop coming in to the tip and ring wires 1 and 2 will now substitute for the bridge held across the outgoing circuit and the CB relay 4 and its dependent relays will release. The SW–3 relay will lock to the sleeve wire 17 and is therefore under control of the distant switch. The SW–3 relay also connects this sleeve wire 17 to the incoming sleeve 3 so that ground may be maintained on conductor 3 to hold the previous switch after the RD relay 9 has released.

Since the RD relay 9 and the RD–1 relay 10 release, a circuit from the RA ground is established to the RL relay 33 and the stepping switch is released and hence during the ensuing use of the outgoing trunk only the SW–3 relay 6 and the DC relay 26 remain operated.

At the end of the use of the established connection the distant connector on the outgoing trunk may be released by the parties thereto whereupon ground will be removed from the sleeve wire 17 thus releasing the SW–3 relay 6 and the DC relay 26 so that the circuit is returned to normal. The preselector remains as it is since the outgoing trunk is now idle.

It may be noted that if the calling subscriber dials the digit 1 repeatedly so that the "N" wiring is used repeatedly, the stepping switch will move to its contact X1 repeatedly and will release repeatedly and the digit 1 will be forwarded to the outgoing trunk repeatedly. The distant switching means will be erroneously set so that if the calling subscriber follows this with a digit 3 or 4 whereby the SW–3 relay 6 becomes operated and the talking circuit is cut through over the outgoing trunk the calling subscriber will be notified by conventional means, such as a connection established to an intercepting operator or a connection to a busy tone, that he has by wrong dialing failed to reach a desired destination. On the other hand, if the calling subscriber dials "one" repeatedly and finally dials "9" whereby the DA relay 7 is properly operated, no erroneous operation will have been caused because the subscriber will be connected to one of the succeeding local trunks reached by the stepping switch and since the SW–2 relay 5 will be operated, the CB relay 4 and any connection to an outgoing trunk will be cut off so that any erroneously set distant switch will be released.

If number 113 has been properly reached, then at the end of the conversation when the distant connector is released the ground returned over the sleeve wire 17 will be removed and the circuit will be returned to normal through the release of the SW–3 relay 6 and the DC relay 26.

*Number 119*

The number 119 is used for the purpose of reaching a reverting call circuit by which a party line subscriber may reach another party on the same line. The operations responsive to the dialing of the first two digits 11 of this number, or any length train of single pulses, will be as hereinbefore described. Thereafter, with the relays CB, RD, RD1, SW1, and DC operated, the stepping switch brushes 21 and 24 resting on their normal contacts and the switch train on the outgoing trunk set to 1 or 11, the subscriber dials 9. This moves the brushes 21 to 24 to their number 9 contacts whereby the Z wiring is encountered. Therefore a circuit is established from the lower winding of the DA relay 7, the Z wiring conductor 28, the X9 terminal and brush 24, a back contact and armature of the DA relay 7 and in parallel therewith at this time a front contact and armature of the DC relay 26 and thence to the circuit closed by the release of the SH relay 19 heretofore described. Thus the stepping switch, driven to its contact 9, causes the operation of the DA relay 7. The original locking circuit for the DC relay 26 is opened but this relay is maintained in operation now through operated contacts of the DA relay 7, closed off normal contacts of the switch 35, front contacts of the RD–1 relay 10, and front contact and armature of the RD relay 9 to ground. Thus the DC relay 26 is maintained in operation. The RL relay is now operated as before, excepting that instead of finding a ground over the "N" wiring conductor 27, it now finds a ground over a front contact and armature of the DC relay 26, a front contact and armature of the DA relay 7, a back contact and armature of the SW–2 relay 5, an armature and back contact of the SH relay 19, the closed interrupter contacts of the stepping switch magnet 32, an armature and back contact of the RL relay 33 to ground. The RL relay operates and locks in a shorter path hereinbefore described, and by such operation causes the operation of the release magnet 32 whereby the stepping switch brushes 21 to 24 are returned to normal.

When the off normal switch 35 is returned to the normal position, the circuit of the DC relay 26 is opened and this relay releases whereupon a circuit for the HT relay 8 is established from battery, winding of the HT relay, back contact and armature of the SW–2 relay 5, normal contacts of the HT relay, armature and front contact of the DA relay 7, back contact and armature of the DC relay 26, closed off normal contacts of the stepping switch, operated contacts of the RD–1 relay 10 and front contact and armature of the RD relay 9 to ground. As the HT relay 8 operates its closes a circuit placing the HA–2 relay 36 in series with the SW–2 relay 5 to the sleeve ground wire 3, and a circuit between the HA–2 relay 36 and the SW–2 relay 5 to the sleeve brush 23. It will therefore appear that if the brush 23 does not encounter a ground (the local trunk is idle) that the circuit of both the SW–2 relay and the HA–2 relay is effective and since the SW–2 relay is of comparatively high resistance and the HA–2 relay is of comparatively low resistance, only the SW–2 relay will operate. Thus the SW–2 relay alone operates on an idle trunk. It will further appear that if the trunk is busy then a ground found by the brush 23 will short circuit the SW–2 relay 5 and cause only the operation of the HA–2 relay 36.

The HA–2 relay 36 controls a circuit from ground, an armature and front contact, if operated, an armature and front contact of the HT relay 8, a front contact and armature of the DA relay 7, a back contact and armature of the SW–3 relay 6, to the stepping switch magnet 20 whereby the switch will be stepped to its next contacts if the trunk on its first contacts are busy but will not move if that first trunk is idle.

The HA–2 relay is controlled by the interrupter springs of the X magnet 20 and hence the interaction of the HA–2 relay and the X magnet 20 causes the brushes 21 to 24 to step until an idle trunk has been found whereupon the ground for the energization of the HA–2 relay is lost at the brush 23 and is sought through the winding of the SW–2 relay 5. But the resistance of the SW–2 relay prevents the reoperation of the HA–2 relay and the operation of the SW–2 relay releases the HT relay 8 whereby the stepping of the switch is halted.

Upon the operation of the SW–2 relay the tip and ring conductors 1 and 2 are disconnected from the CB relay 4 and the RD relay 9 and the RD–1 relay 10 are released, leaving the calling subscriber in control of the selected circuit and the SW–2 relay 5 and the DA relay 7 operated. When the selected circuit has been properly seized a ground is returned over the brush 23 which is extended to the sleeve conductor 3 and holds the SW–2 relay 5 operated in series with the HA–2 relay.

When the calling subscriber has completed his use of the selected circuit he will release it in a conventional manner whereupon the ground will be removed from the sleeve circuit and both the SW–2 relay 5 and the DA relay 7 will be released.

If no idle local trunks are found, then the stepping switch will be driven to its tenth contacts where the tip and ring connections are connected to the windings of the CB relay 4 so that upon the operation of the SW–2 relay 5 when the sleeve brush apparently finds an idle line, the CB relay is still held under control of the calling subscriber. Since the DA relay 7 remains operated, a source of busy tone becomes connected to the upper winding of the CB relay 4 upon the release of the HT relay 8 and the calling subscriber is notified that no reverting circuit is available.

When the calling subscriber hangs up, the circuit will be returned to normal through the releasing of the CB relay, the RD relay, the RD–1 relay, the SW–2 relay and the DA relay. On the release of the RD–1 relay 10, the RA ground is connected to the RL relay 33 and the steping switch is released as before described.

*Number 121*

This number is set forth as a single example of an erroneous operation merely to show what means have been provided to respond to the wrong sequence in the use of the wiring options. It is, as has been set forth hereinbefore, intended that all operations of the stepping switch shall be in two stages, firstly a movement to an "N" wiring position and, secondly, a movement to either a "Q" or a "Z" wiring position. Therefore any number, which dialed, will drive the switch first to either a "Q" or a "Z" position such as the number 121, will establish a circuit to return a busy tone to the calling subscriber.

When, under these circumstances, the subscriber dials 1, he extends his line to the present circuit as hereinbefore described. Should he now dial 2 (or any of the other digits 3 to 8 inclusive) he will establish a circuit over the upper winding of the DA relay 7 and through an armature and back contact of the SW–3 relay 6, a back contact and armature of the DC relay 26, a back contact and armature of the SW–1 relay 11 to the "Q" wire 29, or, if "9" has been dialed as in 191, then from the lower winding of the DA relay 7 to the "Z" wire 28, thence in either case through the brush 24 over a back contact and armature of the DA relay 7, a back contact and armature of the SW–2 relay 5, an armature and back contact of the SH relay upon the release of this relay just after the dialing of this digit to the ground on the back contact of the RL relay. Thus the DA relay is the first to be operated and this, as before explained, will connect busy tone to the upper winding of the CB relay 4 for transmission to the calling subscriber. In this manner a calling subscriber is notified that an error has been committed whereupon he will hang up and the circuit will be restored to normal as hereinbefore explained.

What is claimed is:

1. In a telecommunication system, a trunk circuit having incoming terminals and two outgoing branches, each said branch terminating in dial controlled switching means, the said switching means of both said branches being concurrently responsive to incoming trains of dial pulses, means controlled by one of said switching means for selecting one or the other of said branches for use and means responsive to a said selection for switching said incoming terminals to said selected branch and for releasing the other said branch.

2. In a telecommunication system, a trunk circuit having incoming terminals and two outgoing branches, each said branch terminating in dial controlled switching means, the said switching means of both said branches being concurrently responsive to incoming trains of dial pulses, the said dial controlled means of one of said branches consisting of a single movement stepping switch and circuits controlled thereby for selecting one or the other of said branches for use, means for releasing said stepping switch to a normal position after each said selecting movement and means responsive to the selection of said branch containing said stepping switch for extending said incoming terminals to said branch and for cutting off the other said branch and means thereafter operative to cause said stepping switch to perform an idle line hunting movement to select an idle circuit and for extending said incoming terminals thereto.

3. In a telecommunication system, a trunk having incoming terminals and a plurality of outgoing branches, one of said outgoing branches terminating in a preselector for extending said branch to an outgoing trunk and the other of said branches terminating in a single movement stepping switch, means for discriminating between said two branches controlled by said stepping switch and means controlled by said stepping switch responsive to the selection of said stepping switch branch for further selecting an idle circuit for connection thereto.

4. In a telecommunication system, a trunk having incoming terminals and a plurality of outgoing branches, one of said outgoing branches terminating in a preselector for extending said branch to an idle outgoing trunk and the other of said branches terminating in a single movement stepping switch having a normal position and a plurality of brushes, means for driving said stepping switch by dial pulses transmitted thereto over said incoming terminals, means for repeating said dial pulses concurrently over said preselected outgoing trunk, means controlled over one of said brushes of said stepping switch for interconnecting said incoming terminals and either one or the other of said branches, means responsive to the said selection of said one of said branches for releasing said stepping switch to its said normal position and means responsive to the said selection of said other of said branches for driving said stepping switch from its said normal position to select an idle trunk over other of its said brushes and to free said one of said outgoing branches of said trunk.

5. In a telecommunication system, a trunk circuit terminating in a preselector for maintaining connected thereto an idle trunk to a remote office, a single movement stepping switch in said trunk for selectively operating digit cancelling and digit adding circuits, means for operating said stepping switch by incoming trains of dial pulses and means for concurrently repeating said trains of dial pulses over said preselected trunk to operate selecting means connected thereto in said remote office, said digit cancelling and digit adding circuits operating to confirm or to reject a connection established over said preselected trunk.

6. In a telecommunication system, a trunk circuit terminating in a preselector for maintaining said trunk in extension to an idle outgoing circuit, discriminating means in said trunk to make a choice between further use of said preselected outgoing circuit and other circuits available to said trunk and means for concurrently operating said discriminating means by dial pulses incoming to said trunk and repeating said dial pulses over said preselected outgoing circuit.

7. In a telecommunication system, a trunk circuit terminating in the brushes of an automatically operated preselector having access to a plurality of trunks each extending to a distant office and each terminating in a conventional selector maintained in a condition ready to respond to dial pulses transmitted over said first trunk and concurrently over said preselected trunk, said first trunk also terminating in a plurality of brushes of a single motion stepping switch, one of which controls by its movement in response to dial pulses transmitted over said first trunk the effective use of others of said brushes in extending a local connection over said trunk.

References Cited in the file of this patent

UNITED STATES PATENTS

| | | |
|---|---|---|
| 1,747,478 | Lomax | Feb. 18, 1930 |
| 2,211,443 | Stehlik | Aug. 13, 1940 |
| 2,407,640 | Gillings | Sept. 17, 1946 |
| 2,691,066 | Fisher | Oct. 5, 1954 |
| 2,773,938 | Pharis | Dec. 11, 1956 |
| 2,892,893 | Pharis | June 30, 1959 |